(12) United States Patent
Suzuki et al.

(10) Patent No.: US 12,339,218 B2
(45) Date of Patent: Jun. 24, 2025

(54) SPECTRUM MEASURING DEVICE SUITABLE FOR EVALUATING DIFFERENCE BETWEEN SPECTRA

(71) Applicant: JASCO CORPORATION, Tokyo (JP)

(72) Inventors: Satoko Suzuki, Tokyo (JP); Taiji Oyama, Tokyo (JP); Yoshiro Kondo, Tokyo (JP); Hisashi Masago, Tokyo (JP); Yasuo Horiguchi, Tokyo (JP); Koshi Nagamori, Tokyo (JP)

(73) Assignee: JASCO CORPORATION, Tokyo (JP)

( * ) Notice: Subject to any disclaimer, the term of this patent is extended or adjusted under 35 U.S.C. 154(b) by 573 days.

(21) Appl. No.: 17/528,712

(22) Filed: Nov. 17, 2021

(65) Prior Publication Data
US 2022/0155220 A1     May 19, 2022

(30) Foreign Application Priority Data
Nov. 18, 2020    (JP) .................................. 2020-191690

(51) Int. Cl.
*G01N 21/31*      (2006.01)

(52) U.S. Cl.
CPC ......... *G01N 21/31* (2013.01); *G01N 2201/12* (2013.01)

(58) Field of Classification Search
CPC ........................... G01N 21/31; G01N 2201/12
See application file for complete search history.

(56) References Cited

U.S. PATENT DOCUMENTS

| | | | |
|---|---|---|---|
| 6,615,142 B1* | 9/2003 | Hovde | G06F 17/10 |
| | | | 702/30 |
| 2002/0145425 A1* | 10/2002 | Ebbels | G01R 33/4625 |
| | | | 324/309 |

(Continued)

FOREIGN PATENT DOCUMENTS

| | | | |
|---|---|---|---|
| DE | 60126775 T2 * | 10/2007 | ......... G01N 15/1456 |
| FR | 3011937 A1 * | 4/2015 | ............. G01N 33/12 |

OTHER PUBLICATIONS

Dinh et al., Quantitative spectral comparison by weighted spectral difference for protein higher order structure confirmation, Analytical Biochemistry, vol. 464, Nov. 1, 2014 downloaded from https://doi.org/10.1016/j.ab.2014.07.011 (Year: 2014).*

(Continued)

*Primary Examiner* — Michael J Dalbo
*Assistant Examiner* — Denise R Karavias
(74) *Attorney, Agent, or Firm* — Greenblum & Bernstein, P.L.C.

(57) ABSTRACT

Based on an HT voltage value of each data point applied to a light detector and a plurality of reference spectra measured, in measurement of a reference substance performed for a plurality of times, a weighting function deriver of a spectrum measuring device derives a relation between the HT voltage value (HTi) and a degree of dispersion σi of a plurality of spectral values as a weighting function (σ=f (HT)). Moreover, a numerical evaluator of the spectrum measuring device is configured to calculate a degree of individual coincidence between a sample spectrum and the reference spectrum, acquire the degree of dispersion σi by applying the HT voltage value at measuring the sample spectrum to the weighting function as a weighting value, and evaluate the difference between the reference spectrum and (Continued)

the sample spectrum based on the degree of individual coincidence to which the weighting value is applied.

15 Claims, 8 Drawing Sheets

(56) References Cited

U.S. PATENT DOCUMENTS

| | | | | |
|---|---|---|---|---|
| 2005/0117151 | A1* | 6/2005 | Han | G01N 21/31 356/326 |
| 2007/0291255 | A1* | 12/2007 | Larsen | G01J 3/02 356/73 |
| 2013/0171685 | A1* | 7/2013 | Schutze | G03H 1/0443 435/288.7 |
| 2018/0321086 | A1* | 11/2018 | Kondo | G01J 3/28 |

OTHER PUBLICATIONS

N.N. Dinh et al., "Quantitative Spectral Comparison by Weighted Spectral Difference for Protein Higher Order Structure Confirmation," *Analytical Biochemistry,* vol. 464, Jul. 9, 2014, pp. 60-62.

* cited by examiner

SPECTRUM MEASURING DEVICE SUITABLE FOR EVALUATING DIFFERENCE BETWEEN SPECTRA

RELATED APPLICATIONS

This application claims the priority of Japanese Patent Application No. 2020-191690 filed on Nov. 18, 2020, the disclosure of which is incorporated herein by reference in its entirety.

TECHNICAL FIELD

The present invention relates to a spectrum measuring device, and particularly to a spectrum measuring device suitable for evaluating (converting into numerals) a difference between spectra such as a difference between a reference spectrum and a sample spectrum.

BACKGROUND OF THE INVENTION

When variation of an inner structure of a sample is reflected in an optical spectrum, it becomes very important for assessing variation of the inner structure of the sample to quantitatively grasp how different the spectrum (denoted as U) of the sample to be analyzed is to a reference spectrum (denoted as R).

The difference between spectra as used herein refers to, for example:
- difference between two spectra acquired by measuring different samples respectively;
- variation of spectra in a case where one is a spectrum before an external stimulus is imparted and the other is a spectrum after the external stimulus is imparted with respect to a sample such as a protein; or
- a degree of similarity (coincidence) between the spectrum of the sample to be analyzed and the spectrum of a known substance compiled in a database.

In order to grasp the difference between spectra quantitatively, usually, a degree of coincidence between spectral values in the same data point (referred to as a degree of individual coincidence) is calculated, and this individual coincidence is calculated for all data points individually. As shown in FIG. 8, for example, when the difference between the shapes of the two spectra R, U is very small, it is preferred to evaluate the difference by varying weighting of the degree of individual coincidence for each data point than by calculating the degree of individual coincidence for all data points under a uniform condition. That is, the small difference between spectra is evaluated by applying a weighting value set for each data point to the degree of individual coincidence of each data point, and performing calculation such as adding up the weighted degrees of individual coincidence.

In Non-patent Literature 1, the weighting spectral difference (WSD) method that is an evaluation technique using the Euclidean distance is described. First, a square of a difference between spectral values of the data point i (i=1, 2, . . . , n) is calculated as an degree of individual coincidence between two spectra R, U. This is denoted as "$(U_i - R_i)^2$" (see FIG. 9). Next, as a weighting value of each data point, a value of which an absolute value ($|R_i|$) of the spectral value of the reference spectrum is standardized with its average value ($|R_i|ave$) is used. The weighting value is shown in Equation (1).

[Math. 1]
$$\frac{|R_i|}{|R_i|ave} \quad (1)$$

Here, the denominator of Equation (1) is denoted as Equation (2).

[Math. 2]
$$|R_i|ave = \frac{1}{n} \cdot \sum_{i=1}^{n} |R_i| \quad (2)$$

In evaluation of Non-patent Literature 1, the weighting value of each data point is multiplied by the degree of individual coincidence, and the average value of the weighted degrees of individual coincidence is acquired to calculate its square root. As a result, a numerical value I that denoted the difference between spectra, as shown in Equation (3), can be acquired.

[Math. 3]
$$I = \sqrt{\frac{1}{n} \cdot \sum_{i=1}^{n} \left((U_i - R_i)^2 \cdot \frac{|R_i|}{|R_i|ave}\right)} \quad (3)$$

CITATION LIST

Non-Patent Literature

NON-PATENT LITERATURE 1: N. N. Dinh et al, Analytical Biochemistry, 2014, Vol. 464, p. 60-62

SUMMARY OF THE INVENTION

Technical Problem

The evaluation method described in Non-patent Literature 1 can be regarded as one that executes weighting based substantially on the size ($|R_i|$) of the reference spectral value only. When this method is applied to CD spectrum, for example, weighting becomes larger for the place where the absolute value of the CD value is larger in the data points, and thus contribution to evaluation becomes greater.

Upon evaluating the difference between spectra, although weighting that takes the size ($|R_i|$) of the reference spectral value into consideration, like the method described in Non-patent Literature 1, is important, the inventors focused on the point that there are other factors that should be reflected in evaluation.

Other than the size ($|R_i|$) of the reference spectral value, factors that should be reflected in evaluation of the difference between spectra are: the size of a noise component contained in a signal from a detector; and the point that there is a data point of which the spectral value varies largely according to the sample, and a data point of which the spectral value does not vary so much. Moreover, the inventors have been diligently studying on what kind of evaluation technique is suitable in cases where the sample is configured of a plurality of known components.

The object of the present invention is to find out a weighting function capable of suitably selecting data points that will have a large influence on evaluation of a difference between spectra, and to provide a spectrum measuring device that uses such weighting function. Or, the object of the present invention is to provide a spectrum measuring device capable of suitably evaluating the difference between spectra according to a component configuration in a case where the sample is configured of a plurality of known components.

Solution to Problem

First, the inventors focused on the point that, as a gain-adjustment voltage value to the detector becomes higher according to absorbance of the sample, a noise component in a detection signal in the data point becomes larger. In order to make weighting smaller in the data point having a large noise component, the inventors found an introduction method of a weighting function based on the gain-adjustment voltage value (HT voltage value) of each data point.

That is, the spectrum measuring device that is a first embodiment of the present invention measures a spectrum that can be plotted with the horizontal axis as the data point column and the vertical axis as the spectral value of each data point, and evaluates a difference between a reference spectrum acquired by measuring a reference substance and a sample spectrum acquired by measuring a target sample. The spectrum measuring device has the following characteristics.

In the first embodiment, the sample spectrum is denoted as "U". Moreover, the reference spectrum (and the reference spectral value of each data point) used for calculating the difference to the sample spectrum is denoted as Equation (4). The reference spectrum of Equation (4) is an average spectrum of a plurality of spectra acquired by measuring the reference substance for a plurality of times. The "average spectrum" denotes a spectrum acquired by calculating an average value of spectral values of each data points acquired for a plurality of spectra. The reference spectrum of Equation (4) has a different concept from an average of the absolute values of the reference spectra defined in the above Equation (2). The reference spectrum used for calculating the difference to the sample spectrum is not limited to the average spectrum of a plurality of spectra, and the reference spectrum acquired by measuring the reference substance for one time may be used.

[Math. 4]

$$\overline{R}, \overline{R}_i \tag{4}$$

The spectrum measuring device of the first embodiment comprises a weighting function deriver that derives a relation, as a weighting function ($\sigma$) denoted as the following equation, between a gain-adjustment voltage value (HTi) in a certain data point (i) and a degree of dispersion ($\sigma$i) of a plurality of spectral values (Ri) measured in that data point. The weighting function ($\sigma$) is derived based on the gain-adjustment voltage value (HT voltage value) of each data point applied to a light detector and the acquired plurality of reference spectra, in measurement of the reference substance performed for a plurality of times.

[Math. 4A]

$$\sigma = f(HT) \tag{4A}$$

Moreover, the spectrum measuring device of the first embodiment comprises a storage that stores the weighting function, and a numerical evaluator that uses the weighting function to evaluate (convert into numerals) the difference between the reference spectrum acquired by measuring the reference substance for one or more times and the sample spectrum.

Here, the numerical evaluator is configured to calculate a degree of individual coincidence between the sample spectrum (U) and the reference spectrum for each data point (i). When the average spectrum of a plurality of spectra is to be used as the reference spectrum, the degree of individual coincidence may be defined as the following equation, for example.

[Math. 5]

$$(U_i - \overline{R}_i)^2 \tag{5}$$

Moreover, the numerical evaluator is configured to:
calculate the degree of dispersion ($\sigma$i) acquired by applying the gain-adjustment voltage value (HTi) of each data point (i) when the sample spectrum (U) is measured to the weighting function as a weighting value; and
evaluate the difference between the reference spectrum and the sample spectrum based on the degree of individual coincidence to which the weighting value of each data point (i) is applied.

Here, the degree of individual coincidence to which the weighting value is applied may be defined as the following equation, for example.

[Math. 6]

$$(U_i - \overline{R}_i)^2 \cdot \frac{\sigma_{ave}}{\sigma_i} \tag{6}$$

$$\text{here, } \sigma_{ave} = \frac{1}{n} \cdot \sum_{i=1}^{n} \sigma_i$$

Moreover, a numerical value (I) that denotes the difference between the reference spectrum and the sample spectrum may be defined as the following equation, for example. Here, "n" is a natural number of two or greater, and denotes the number of data points of the spectrum.

[Math. 7]

$$I = \sqrt{\frac{1}{n} \cdot \sum_{i=1}^{n} \left( (U_i - \overline{R}_i)^2 \cdot \frac{\sigma_{ave}}{\sigma_i} \right)} \tag{7}$$

In a conventional CD spectrum measuring device, for example, when there is UV absorbance of the sample in a certain data point, the amount of light to the light detector decreases, and the detection signal becomes weaker. Accordingly, the voltage value (HT voltage value) applied to the light detector such as photomultiplier tubes is adjusted to increase or decrease the gain of the light detector, so that the size of the detection signal is kept constant. However, when the gain-adjustment voltage is enlarged to increase the gain, the noise component in the detection signal is also amplified simultaneously. In order to suppress such influence of the noise component, the inventors considered that the setting of weighting should be taken into consideration so that the weighting value becomes lighter in the data point having a large noise component.

The inventors determined that the degree of dispersion ($\sigma$i) of the spectral values in a certain data point can be regarded as the size of the noise component in that data point from the result of spectral measurement of the reference substance performed for a plurality of times.

When measuring a spectrum, the spectrum measuring device of the first embodiment can acquire a combination of data of the gain-adjustment voltage value (HTi) and the degree of dispersion ($\sigma$i) of spectral values for each data point. The combinations of data acquired for all data points (i) are plotted to a two-axis coordinate system having an axis of the gain-adjustment voltage value and an axis of the degree of dispersion, for example. The weighting function ($\sigma$=f(HT)) that denotes the relation between two variables (HTi, $\sigma$i), i.e., the relation between the gain-adjustment voltage value and the size of the noise component, can be derived by a known method such as a linear-approximation method or a curve-fitting method.

The spectrum measuring device of the first embodiment described above uses the derived weighting function ($\sigma$=f(HT)) to acquire the size of the noise component due to absorption of the sample for each data point of spectral measurement of a certain sample. By using the degree of dispersion ($\sigma$i) acquired from the weighting function as the weighting value, it became possible to weight the degree of individual coincidence between spectra according to the size of the noise component. That is, use of the weighting function allows to make weighting lighter in the data point of which the noise component becomes larger due to absorbance of the sample, and make weighting heavier in the data point having a small noise component.

In the first embodiment, a method of dividing the degree of individual coincidence by its weighting value may be adopted as the method of applying the weighting value (the degree of dispersion $\sigma$i) to the degree of individual coincidence between spectra.

Next, the inventors focused on the point that, by actually measuring the spectra before and after an external stimulus of some kind is imparted to the reference substance, the data point of which the spectrum largely varies by the external stimulus and the data point of which the spectrum does not vary so much can be distinguished. By using a preliminary spectral measurement value, the weighting value is set such that weighting becomes larger to the data point of which the spectrum easily varies for each reference substance.

As the external stimulus imparted to the reference substance, it is preferred to vary any one or more of: temperature, pH, pressure, electric field, magnetic field, light, stress, protein concentration, types of buffers, concentration of buffers, types of additives, or concentration of additives. Or, it may be addition of denaturants. When the external stimulus is varied in phases (e.g., when the temperature is continuously varied from 25° C. to 50° C.), the timings of before and after imparting the external stimulus includes the timings of two points during variation (e.g., the timings of two points at 30° C. and 45° C.)

That is, the spectrum measuring device of a second embodiment of the present invention measures the spectrum that can be plotted with the horizontal axis as the data point column and the vertical axis as the spectral value of each data point, and evaluates the difference between the reference spectrum acquired by measuring the reference substance and the sample spectrum acquired by measuring the target sample. The spectrum measuring device has the following characteristics.

In the second embodiment, the sample spectrum is denoted as "U". The reference spectrum is denoted as "R", and the reference spectral value of each data point is denoted as "Ri". Instead of the reference spectrum acquired by measuring the reference substance for one time, an average spectrum (the same as the above Equation (4)) of a plurality of spectra acquired by measuring the reference substance for a plurality of times may be used as the reference spectrum. Moreover, the spectrum of the reference substance measured after the external stimulus is imparted is denoted as "R'" to distinguish from the reference spectrum "R".

The spectrum measuring device of the second embodiment comprises:
  an external-stimulus imparter that imparts an external stimulus to a reference substance;
  a spectrum measuring section that measures a spectrum (U) of a target sample, and each spectrum (R, R') of the reference substance of before and after the external stimulus is imparted, and
  a weighting function deriver that derives a weighting function ($\xi$=f(R, R')) that imparts a weighting value ($\xi$i) according to an amount of variation of the spectral values (Ri, Ri') of each data point before and after the external stimulus is imparted to the reference substance.

The spectrum measuring device of the second embodiment comprises:
  a storage that stores the weighting function ($\xi$); and
  a numerical evaluator that uses the weighting function ($\xi$) to evaluate the difference between the reference spectrum (R) and the sample spectrum (U).

Here, the numerical evaluator is configured to calculate a degree of individual coincidence between the sample spectrum (U) and the reference spectrum (R) for each data point (i). The degree of individual coincidence may be defined as the above Equation (5), for example.

Moreover, the numerical evaluator is configured to use the weighting value of each data point provided by the weighting function to evaluate the difference between the reference spectrum (R) and the sample spectrum (U) based on the degree of individual coincidence to which the weighting value is applied.

Here, the weighting function deriver may be configured to derive a weighting function ($\xi$) which provides an absolute value (|Ri'−Ri|) of a difference between each spectral value (Ri, Ri') of the reference spectrum before and after the external stimulus is imparted as the weighting value of each data point. In this case, the weighting function is denoted as follows.

[Math. 7A]

$$\xi = |R' - R| \tag{7A}$$

Moreover, the degree of individual coincidence to which the weighting value ($\xi$i) is applied may be denoted as the following equation, for example.

[Math. 8]

$$(U_i - R_i)^2 \cdot \frac{\xi_i}{\xi_{ave}} \qquad (8)$$

$$\text{here, } \xi_{ave} = \frac{1}{n} \cdot \sum_{i=1}^{n} \xi_i$$

Moreover, a numerical value (I) that denotes the difference between the reference spectrum (R) and the sample spectrum (U) may be defined as the following equation, for example.

[Math. 9]

$$I = \sqrt{\frac{1}{n} \cdot \sum_{i=1}^{n} \left( (U_i - R_i)^2 \cdot \frac{\xi_i}{\xi_{ave}} \right)} \qquad (9)$$

According to the configuration of the spectrum measuring device of the second embodiment described above, the external-stimulus imparter and the spectrum measuring section impart an external stimulus of some kind to the reference substance in advance, and actually measures the spectra before and after the external stimulus is imparted; and the weighting function deriver derives a function ($\xi$=f(R, R')) that provides the weighting value ($\xi i$) according to the amount of variation of the spectral value before and after the external stimulus is imparted. That is, it can be said that the weighting function ($\xi$) is a function that can denote how the data points of which the spectra easily vary by the external stimulus of some kind are distributed. As a result, when evaluating the difference between spectra of the reference substance relative to the target sample to which the external stimulus of some kind is imparted, the numerical evaluator can make weighting larger to the degree of individual coincidence in the data point of which variation of spectrum is large in the reference substance among the degrees of individual coincidence between the sample spectrum (U) and the reference spectrum (R), and make weighting smaller to the degree of individual coincidence in the data point of which variation of spectrum is small; and therefore, information of the data point of which the spectrum of the sample easily varies is greatly reflected in evaluation.

In the second embodiment, a method of multiplying the degree of individual coincidence by the weighting value ($\xi i$) may be adopted as the method of applying the weighting value ($\xi i$) to the degree of individual coincidence between spectra. Moreover, the numerical evaluator is preferably configured to further apply a different weighting value (e.g. $\sigma i$) to the degree of individual coincidence to which the above weighting value ($\xi i$) is applied.

Next, when evaluating the difference between spectra for a sample containing a plurality of components or structures, the inventors found the difference between spectra of the target sample containing a plurality of components or structures can be suitably evaluated by:

(1) analyzing the components or structures based on a reference spectrum of a reference substance, and acquiring proportions of each component or structure in advance; and (2) using the reference spectrum of each component or structure of the reference substance to add up those that multiplied an absolute value of the reference spectrum by each proportion and acquire a total spectrum, and using the total spectrum as the weighting function in evaluation.

For example, as for a compound consisting of a plurality of components, a known component-analysis software is used to acquire proportions (%) of each component based on the spectrum of the compound.

That is, the spectrum measuring device of a third embodiment of the present invention measures the spectrum that can be plotted with the horizontal axis as the data point column and the vertical axis as the spectral value of each data point, and evaluates the difference between the reference spectrum acquired by measuring the reference substance and the sample spectrum acquired by measuring the target sample. The spectrum measuring device has the following characteristics.

In the third embodiment, the sample spectrum is denoted as "U". The reference spectrum is denoted as "R", and the reference spectral value of each data point is denoted as "Ri". Instead of the reference spectrum acquired by measuring the reference substance for one time, an average spectrum of a plurality of spectra acquired by measuring the reference substance for a plurality of times (the same as the above Equation (4)) can be used as the reference spectrum.

The spectrum measuring device of the third embodiment, of which a sample containing a plurality of components or structures is set as a measurement target, comprises:

a component or structure analyzer that acquires proportions of each component or each structure contained in a reference substance based on a reference spectrum (R); and a weighting function deriver that adds up those that multiplied an absolute value of the reference spectrum of each component or structure by the proportion of the component or structure for all components or structures to calculate a total spectrum, and derives the total spectrum as a weighting function ($\eta$) that provides a weighting value ($\eta i$) of each data point.

The spectrum measuring device of the third embodiment comprises:

a storage that stores the weighting function ($\eta$); and a numerical evaluator that uses the weighting function ($\eta$) to evaluate the difference between the reference spectrum (R) and the sample spectrum (U).

Here, the numerical evaluator is configured to calculate a degree of individual coincidence between the sample spectrum (U) and the reference spectrum (R) for each data point (i). The degree of individual coincidence may be defined as the above Equation (5), for example.

The numerical evaluator is configured to use the weighting value ($\eta i$) of each data point that is provided by the weighting function ($\eta$) to evaluate the difference between the reference spectrum (R) and the sample spectrum (C) based on the degree of individual coincidence to which the weighting value ($\eta i$) is applied.

Here, the weighting function deriver may calculate the total spectrum by adding up those that multiplied the absolute value of the reference spectrum of each component or structure by the proportion of the component or structure for all components or structures.

For example, when secondary structures that configure a sample consisting of a protein are $\alpha$-helix, $\beta$-sheet, $\beta$-turn and random coil, the reference spectra of each secondary structure are denoted as "R$\alpha$, R$\beta$, Rt, Rr", and the proportions (%) of each secondary structure of the sample are denoted as "dα, dβ, dt, dr". In this case, the weighting function is denoted as the total spectrum of the following equation.

[Math. 9A]

$$\eta = (|R\alpha| \cdot d\alpha$$
$$+ |R\beta| \cdot d\beta$$
$$+ |Rt| \cdot dt$$
$$+ |Rr| \cdot dr)/100 \quad (9A)$$

Moreover, the degree of individual coincidence to which the weighting value is applied may be defined as the following equation. Moreover, the numerical evaluator is preferably configured to further apply a different weighting value (e.g. σi) to the degree of individual coincidence to which the above weighting value (ηi) is applied.

[Math. 10]

$$(U_i - R_i)^2 \cdot \frac{\eta_i}{\eta_{ave}} \quad (10)$$

$$\text{here, } \eta_{ave} = \frac{1}{n} \cdot \sum_{i=1}^{n} \eta_i$$

Moreover, a numerical value (I) that denotes the difference between the reference spectrum (R) and the sample spectrum (U) may be defined as the following equation.

[Math. 11]

$$I = \sqrt{\frac{1}{n} \cdot \sum_{i=1}^{n} \left( (U_i - R_i)^2 \cdot \frac{\eta_i}{\eta_{ave}} \right)} \quad (11)$$

Next, the inventors focused on the point that, by actually measuring each spectrum before and after an external stimulus of some kind is imparted to the reference substance, the data point of which the spectrum largely varies by the external stimulus and the data point of which the spectrum does not vary so much can be distinguished. A preliminary spectral measurement value is used to set the weighting value such that weighting becomes larger to the data point of which the spectrum easily varies for each reference substance. Then, this was applied for evaluating the difference between spectra for a sample that contains a plurality of components or structures, e.g., a protein. That is, it was found that the difference between spectra for a target sample containing a plurality of components or structures can be suitably evaluated by:

(1) analyzing the components or structures based on a reference spectrum of a reference substance in advance to acquire proportions of each component or structure;

(2) subsequently, analyzing the components or structures based on the spectrum after an external stimulus of some kind is imparted to the reference substance to acquire proportions of each component or structure;

(3) calculating an amount of variation of the proportions before and after the external stimulus is imparted for each component or structure of the reference substance to acquire its absolute value; and (4) adding up those that multiplied the absolute value of the reference spectrum of each component or structure of the reference substance by the absolute value of the amount of variation of each proportion to acquire a total spectrum to use the same as a weighting function in evaluation.

The external stimulus imparted to the reference substance and the timings of before and after imparting the external stimulus are as described in the above second embodiment.

That is, the spectrum measuring device that is a fourth embodiment of the present invention measures a spectrum that can be plotted with the horizontal axis as the data point column and the vertical axis as the spectral value of each data point, and evaluates the difference between a reference spectrum acquired by measuring the reference substance and a sample spectrum acquired by measuring the target sample. The spectrum measuring device has the following characteristics.

In the fourth embodiment, the sample spectrum is denoted as "U". The reference spectrum is denoted as "R", and the reference spectral value of each data point is denoted as "Ri". Instead of the reference spectrum acquired by measuring the reference substance for one time, an average spectrum of a plurality of spectra acquired by measuring the reference substance for a plurality of times (the same as the above Equation (4)) may be used as the reference spectrum. Moreover, the spectrum of the reference substance measured after the external stimulus is imparted is denoted as "R'" to distinguish from the reference spectrum "R".

The spectrum measuring device of the fourth embodiment, of which a sample containing a plurality of components or structures is set as a measurement target, comprises:

an external-stimulus imparter that imparts an external stimulus to a reference substance;

a spectrum measuring section that measures a spectrum (U) of the target sample and each spectrum (R, R') of the reference substance before and after the external stimulus is imparted;

a component or structure analyzer that acquires respective proportions of each component or structure contained in the reference substance based on the spectrum (R) of the reference substance before the external stimulus is imparted, and acquires respective proportions of each component or structure contained in the reference substance after the external stimulus is imparted based on the spectrum (R') of the reference substance after the external stimulus is imparted;

a variation-amount calculator that calculates an absolute value of an amount of variation of the proportions before and after the external stimulus is imparted for each component or structure of the reference substance; and a weighting function deriver that adds up those that multiplied the absolute value of the reference spectrum of each component or structure by the absolute value of the amount of variation of the proportions of the component or structure for all components or structures to calculate a total spectrum, and derives the total spectrum as a weighting function ($\varphi$) that provides a weighting value ($\varphi i$) of each data point.

The spectrum measuring device of the fourth embodiment comprises:

a storage that stores the weighting function ($\varphi$); and a numerical evaluator that uses the weighting function ($\varphi$) to evaluate the difference between the reference spectrum (R) and the sample spectrum (U).

Here, the numerical evaluator is configured to calculate a degree of individual coincidence between the sample spectrum (U) and the reference spectrum (R) for each data point (i). The degree of individual coincidence may be defined as the above Equation (5), for example.

Moreover, the numerical evaluator is configured to use the weighting value (φi) of each data point provided by the weighting function (φ) to evaluate the difference between the sample spectrum (U) and the reference spectrum (R) based on the degree of individual coincidence to which the weighting value (φi) is applied.

Here, the weighting function deriver may add up those that multiplied the absolute value of the reference spectrum of each component or structure by the absolute value of the amount of variation of the proportions of the components or structures for all components or structures to calculate a total spectrum.

For example, when secondary structures that configure a sample consisting of a protein are α-helix, β-sheet, β-turn and random coil, the reference spectra of each secondary structure are denoted as "Rα, Rβ, Rt, Rr", the proportions (%) of each secondary structure of the sample are denoted as "dα, dβ, dt, dr", and the proportions (%) of each secondary structure of the sample after the external stimulus is imparted are denoted as "dα', dβ', dt', dr'". In this case, the weighting function is denoted as the total spectrum of the following equation.

[Math. 11A]

$$\varphi = (|R\alpha| \cdot |d\alpha - d\alpha'|$$
$$+ |R\beta| \cdot |d\beta - d\beta'|$$
$$+ |Rt| \cdot |dt - dt'|$$
$$+ |Rr| \cdot |dr - dr'|)/100 \tag{11A}$$

Moreover, the degree of individual coincidence to which the weighting value is applied may be defined as the following equation, for example.

[Math. 12]

$$(U_i - R_i)^2 \cdot \frac{\phi_i}{\phi_{ave}} \tag{12}$$

here, $\phi_{ave} = \frac{1}{n} \cdot \sum_{i=1}^{n} \phi_i$

Moreover, a numerical value (I) that denotes the difference between the reference spectrum (R) and the sample spectrum (U) may be defined as the following equation, for example. Moreover, the numerical evaluator is preferably configured to further apply a different weighting value (e.g. σi) to the degree of individual coincidence to which the above weighting value (φi) is applied.

[Math. 13]

$$I = \sqrt{\frac{1}{n} \cdot \sum_{i=1}^{n} \left( (U_i - R_i)^2 \cdot \frac{\phi_i}{\phi_{ave}} \right)} \tag{13}$$

The devices of each embodiments described above preferably comprise a noise eliminator that executes a noise elimination processing, such as a smoothing processing, an FFT noise elimination filtering processing, and a principal-component analysis (PCA) processing, to a measurement data of the reference spectrum and the sample spectrum that are measured, and the numerical evaluator preferably calculates the degree of individual coincidence for the reference spectrum and the sample spectrum of which the noise is eliminated by the noise eliminator.

Moreover, a representative technique of evaluating the difference between two spectra in the above embodiments is described. The above Equation (7) shows that the difference between two spectra is evaluated by the Euclidean distance. When evaluating by the Manhattan distance, a degree of individual coincidence defined by the absolute value of the difference between the spectral values as in Equation (14) can be used to calculate the numerical value I from Equation (15).

[Math. 14]

$$|U_i - \overline{R_i}| \tag{14}$$

[Math. 15]

$$I = \frac{1}{n} \cdot \sum_{i=1}^{n} \left( |U_i - \overline{R_i}| \cdot \frac{\sigma_{ave}}{\sigma_i} \right) \tag{15}$$

When evaluating by a correlation coefficient of the spectrum, the degree of individual coincidence as in Equation (16) can be used to calculate the numerical value I from Equation (17).

[Math. 16]

$$(U_i - U_i ave)(\overline{R_i} - \overline{R_i} ave) \tag{16}$$

[Math. 17]

$$I = \frac{\sum_{i=1}^{n} \left( (U_i - U_i ave) \cdot (\overline{R_i} - \overline{R_i} ave) \cdot \frac{\sigma_{ave}}{\sigma_i} \right)}{\sqrt{\sum_{i=1}^{n} (U_i - U_i ave)^2 \cdot \frac{\sigma_{ave}}{\sigma_i}} \cdot \sqrt{\sum_{i=1}^{n} (\overline{R_i} - \overline{R_i} ave)^2 \cdot \frac{\sigma_{ave}}{\sigma_i}}} \tag{17}$$

In Equations (15) and (17), instead of the average spectrum (the same as the above Equation (4)) of a plurality of spectra acquired by measuring the reference substance for a plurality of times, the spectrum (R) acquired by measuring the reference substance for one time as the reference spectrum may be used.

A shown in Equations (7), (15) and (17), the numerical evaluator in the spectrum measuring device of the present invention is preferably configured to calculate the difference between spectra by a numerical value of any one of the Euclidean distance, the Manhattan distance and a correlation coefficient based on the degree of individual coincidence to which the weighting value is applied.

Here, when calculating the numerical value of the Euclidean distance or the Manhattan distance between the reference spectrum and the sample spectrum, the numerical evaluator preferably uses those that divided the reference spectrum and the sample spectrum by their respective spectral areas to calculate the numerical value of the Euclidean distance or the Manhattan distance.

Moreover, the numerical evaluator in the spectrum measuring device of the present invention is preferably configured to further apply a different weighting value to the degree of individual coincidence to which the above weighting value is applied.

Advantageous Effects of the Invention

According to the spectrum measuring device of the first embodiment of the present invention, it is now possible to execute weighting according to a noise component due to absorption of the sample for each data point of the sample spectrum when evaluating the difference between spectra.

Moreover, according to the spectrum measuring device of the second embodiment of the present invention, it is now possible to suitably set difference weightings, based on an actual measurement value of the spectrum of a reference substance, such that weighting is made heavier to the data point of which the spectral value varies largely according to the sample, and weighting is made lighter to the data point of which the spectral value does not vary so much.

Moreover, according to the spectrum measuring device of the third and fourth embodiments of the present invention, it is now possible to suitably evaluate the difference between spectra according to the component configuration in a case where the sample is configured of a plurality of known components.

As described, according to the spectrum measuring device of the present invention, it is now possible to suitably select the data point that has a large influence on evaluation of the difference between spectra, and detect the difference between spectra with high sensitivity.

DESCRIPTION OF EMBODIMENTS

First Embodiment

Figure 1:
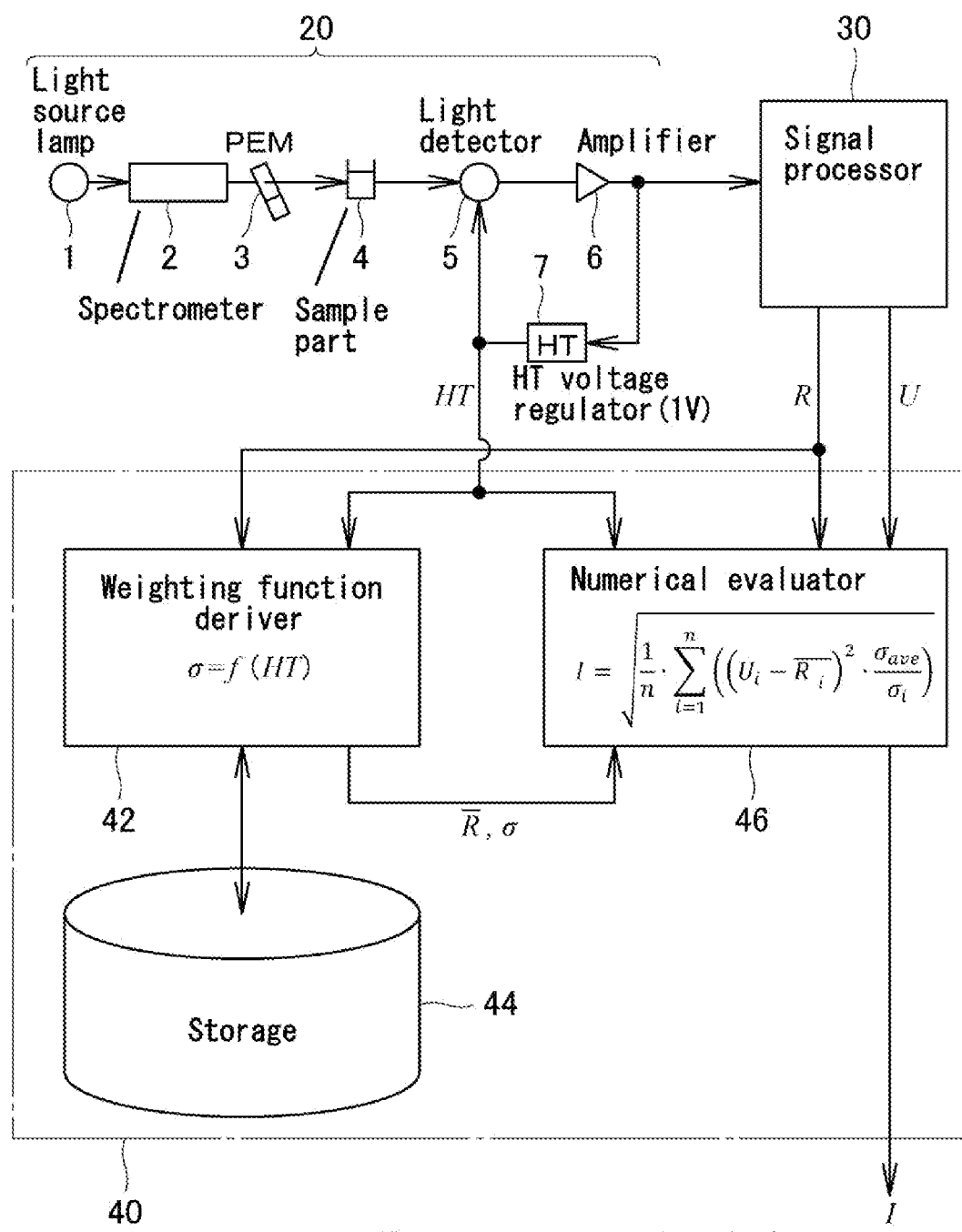
FIG. 1 is a schematic configuration of a CD spectrum measuring device according to the first embodiment.

The configuration of the CD spectrum measuring device according to the first embodiment is described based on FIG. 1. This CD spectrum measuring device 10 comprises a function for measuring a CD spectrum of a sample and a function for evaluating variation of the measured CD spectrum to output the same, and is capable of assessing a structural variation of the sample quantitatively. In particular, it is preferred for assessing existence/absence of denaturation of a protein quantitatively, and is effective for quality control in development or production of biopharmaceuticals including protein preparations, for example.

CD (circular dichroism) is defined by a difference between absorbance when a right-handed/left-handed circularly polarized light is irradiated to a sample. In general, CD spectrum measuring devices irradiate a right-handed/left-handed circularly polarized light alternately to a sample, detect a transmitted light by a light detector, extract a direct (DC) component voltage and a weak alternating (AC) component voltage of a detection signal, and calculate a CD value of the sample based on its ratio (AC/DC). In such measuring devices, the detection signal is amplified so that a signal of a constant output voltage (e.g., 1 V) can be detected in a wavelength region where the signal from the light detector is weak.

The CD spectrum measuring device 10 of FIG. 1 is configured of a measurement body 20, a signal processor 30, and a quantitative assessor 40 for variation of a spectrum.

The measurement body 20 has optical configurations and control configurations that are generally necessary for measuring a CD spectrum. An example comprising a light source lamp 1, a spectrometer 2, a polarization modulator (PEM) 3, a sample part 4, a light detector 5, an amplifier 6 and an HT voltage regulator 7 is shown.

In the measurement body 20, the spectrometer 2 spectrally disperses the irradiated light from the light source lamp 1 to take out a light having a single wavelength. The single wavelength light is continuously and periodically polarized as a right-handed/left-handed circularly polarized light by modulation of the PEM 3. The right-handed/left-handed circularly polarized light that continuously varies and is generated by the PEM 3 transmits through a sample of the sample part 4 as a measurement light, and the transmitted light is detected by the light detector 5.

The sample part 4 is configured of a sample cell capable of holding the sample according to its state (solid, liquid, gas, or a mixed state thereof), or continuously flowing the sample. As the sample, a target sample that is prepared in advance and a reference substance according to the target sample are used.

When the sample has circular dichroism, a difference between absorbance to the left-handed circularly polarized light and absorbance to the right-handed circularly polarized light occurs; therefore, variation of a light intensity detected by the light detector 5 is an alternating-current component (AC component) that varies at a modulation frequency f of the PEM 3.

The amplifier 6 amplifies the light intensity signal detected by the light detector 5 and sends it to the signal processor 30.

The signal processor 30 reads out the AC component in the light intensity signal based on a reference signal from a PEM driver, and calculates a measurement value (CD value) of circular dichroism of the sample. Moreover, the spectrometer 2 varies the wavelength of the measurement light in phases, and the signal processor 30 calculates the CD value of the sample each time the wavelength is varied, so that a CD spectrum of the sample is acquired. The data of the CD spectrum is output to the quantitative assessor 40 for variation of a spectrum.

The amplified signal from the amplifier 6 is also sent to the HT voltage regulator 7. This HT voltage regulator 7 comprises a DC feedback circuit and an HT voltage regulation part, not shown. First, the amplified signal from the amplifier 6 is taken into the DC feedback circuit, and a direct-current component (DC component) in the amplified signal is compared to a reference voltage of 1 V, for example. Then, the HT voltage regulation part controls a voltage applied to the light detector 5 such that the DC component in the amplified signal becomes the same as the reference voltage (e.g., 1 V). That is, the HT voltage regulator 7 regulates the applied voltage value such that amplification of voltage after photoelectric conversion becomes larger as the amount of the light received by the light detector is smaller, and automatically sets the detection signal to a constant signal level. The applied voltage value to the light detector 5 as used herein may be also called as a "gain-adjustment voltage value" or "HT voltage value".

The data of the CD spectrum is a data consisting of CD values of each point of n wavelength points i acquiring the CD value. Usually, it is shown as the wavelength of the measurement light on the horizontal axis, and the CD value on the vertical axis.

Here, the quantitative assessor 40 for variation of a spectrum that is characteristic in the present invention is described. The quantitative assessor 40 is configured of computers or the like, and comprises a weighting function deriver 42, a storage 44 and a numerical evaluator 46 that function by execution actions of programs stored therein.

The weighting function deriver 42 receives a plurality of spectral data R respectively measured for a plurality of reference substances (or acquired by measuring one reference substance for a plurality of times) from the signal processor 30, and receives a signal of the HT voltage value applied to the light detector 5 in measurement of the reference substance from the HT voltage regulator 7.

Based on the information, the weighting function deriver 42 derives a relation between the HT voltage value in a certain wavelength point i and a degree of dispersion σi of a plurality of spectral values Ri measured in the wavelength point i as a weighting function σ like Equation (4A).

[Math. 17A]

$$\sigma = f(HT) \tag{4A}$$

The weighting function deriver 42 may calculate, for example, a standard deviation SDi of a plurality of spectral values Ri in the wavelength point i as the degree of dispersion σi. An example of an equation of the standard deviation SDi regarding m spectral values Ri is denoted in the following.

[Math. 18]

$$SD_i = \sqrt{\frac{1}{m} \cdot \sum_{j=1}^{m}(R_{ij} - \overline{R_i})^2} \tag{18}$$

Figure 2:
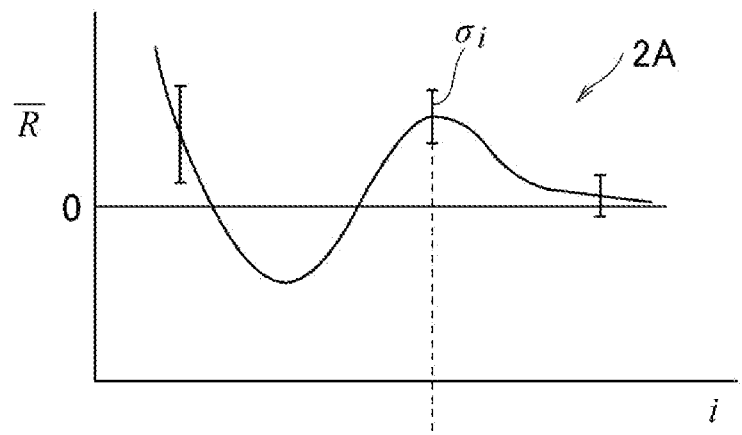
FIG. 2 shows an example of a method for deriving a weighting function (σ).
Figure 2:
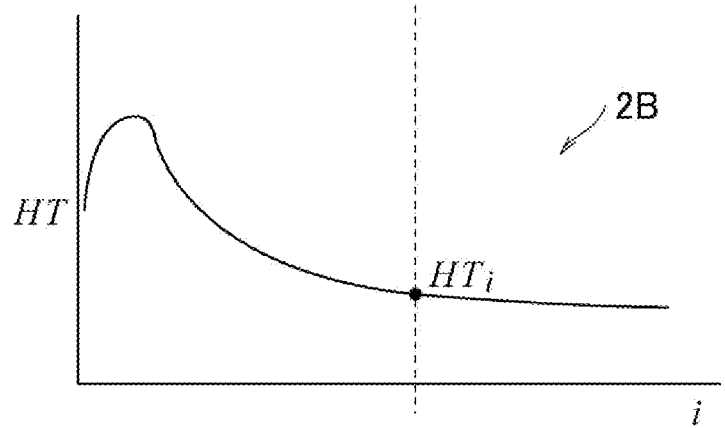
Figure 2:
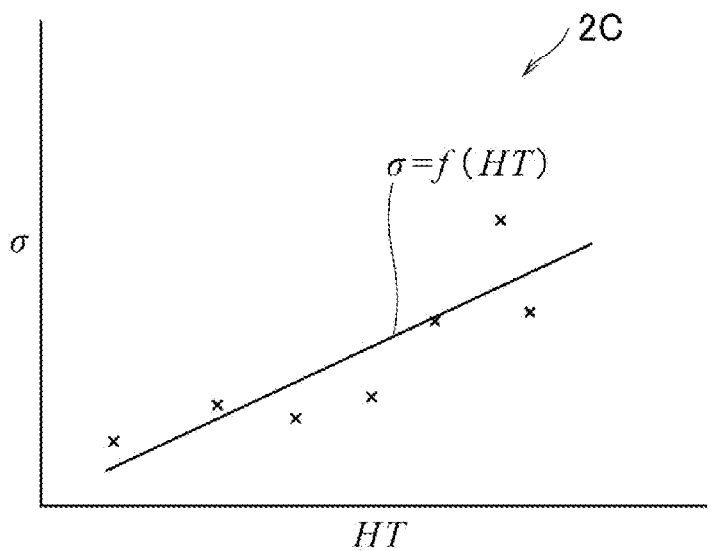

FIG. 2 shows an example of a method for deriving the weighting function σ. The spectrum 2A in FIG. 2 is an average spectrum of a plurality of spectral data R acquired by measuring the reference substance. For clarification, in the spectrum 2A, the degree of dispersion σi of the spectral values Ri in the wavelength point i is shown with a stick in a vertical direction. Next, in Graph 2B, the HT voltage values (HTi) of each wavelength point i are plotted. Moreover, Graph 2C is plotted with the degree of dispersion σi on the vertical axis and the HT voltage value HTi on the horizontal axis. The weighting function deriver 42 uses existing methods such as a linear-approximation method or a curve-fitting method to derive the weighting function σ based on the data plotted in Graph 2C. The weighting function σ based on linear approximation of the graph 2C is merely an example.

The storage 44 of FIG. 1 is configured to store the derived weighting function σ together with the data of the average spectrum such that the numerical evaluator 46 can read them out suitably.

The numerical evaluator 46 receives the data of a sample spectrum U measured for the target sample from the signal processor 30, and receives a signal of the HT voltage value applied to the light detector 5 in measurement of the target sample from the HT voltage regulator 7. When evaluating the difference between the sample spectrum and the reference spectrum, the numerical evaluator 46 may use the reference spectrum stored as the average spectrum in the storage 44 (refer to Equation (4)), or may use the reference spectrum acquired by newly measuring the reference substance for one time or a plurality of times from the signal processor 30. Based on the information, the degree of individual coincidence (e.g., Equation (5)) between the sample spectrum U and the reference spectrum is calculated for each wavelength point i. When the reference spectrum acquired by measuring the reference substance for one time is used, the degree of individual coincidence is denoted as "(Ui–Ri)²".

[Math. 19]

$$(U_i - \overline{R_i})^2 \tag{5}$$

Moreover, the numerical evaluator 46 applies the HT voltage value (HTi) of when the sample spectrum U is measured to the weighting function σ to calculate the weighting value σi of each wavelength point i. Then, the numerical evaluator 46 divides the individual coincidence of each wavelength point by "σi/σave" like Equation (6) to weight the degree of individual coincidence. Here, one that standardized the weighting value (σi) by the average value (σave) of the weighting values is used; however, instead of Equation (6), it may be weighted by dividing the degree of individual coincidence by "σi".

[Math. 20]

$$(U_i - \overline{R_i})^2 \cdot \frac{\sigma_{ave}}{\sigma_i} \tag{6}$$

$$\text{here, } \sigma_{ave} = \frac{1}{n} \cdot \sum_{i=1}^{n} \sigma_i$$

Finally, in accordance with Equation (7), the difference between the reference spectrum and the sample spectrum is evaluated by acquiring an average value of the weighted degrees of individual coincidence and calculating a square root thereof.

[Math. 21]

$$I = \sqrt{\frac{1}{n} \cdot \sum_{i=1}^{n}\left((U_i - \overline{R_i})^2 \cdot \frac{\sigma_{ave}}{\sigma_i}\right)} \tag{7}$$

By using the above configuration, the numerical value I that denotes the difference between the reference spectrum and the sample spectrum is calculated and is output from the numerical evaluator 46.

In the first embodiment, the case of the CD spectrum measuring device was described; however, the spectrum measuring device of the present invention is generally applicable to devices for measuring spectra such as CD spectra, infra-red absorption spectra, ultra-violet visible absorption spectra, fluorescent spectra, Raman spectra and the like. The data point i may be suitably selected from a wavenumber, a wavelength and an amount of Raman shift according to the types of spectra.

Second Embodiment

Figure 3:
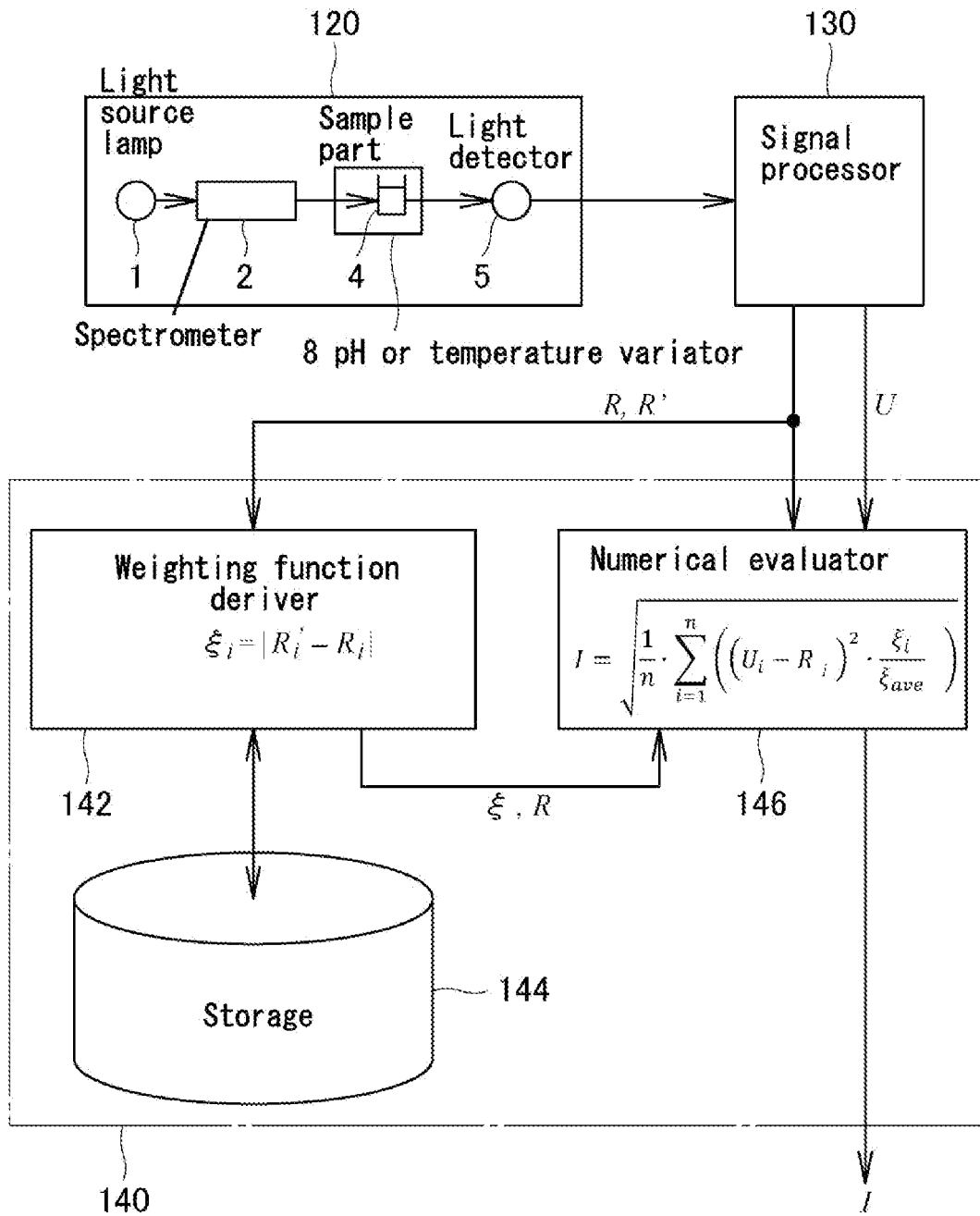
FIG. 3 is a schematic configuration of a spectrum measuring device according to the second embodiment.

Next, the configuration of the spectrum measuring device according to the second embodiment is described based on FIG. 3. This spectrum measuring device 110 comprises a function for measuring a spectrum of a sample, and a function for evaluating variation of the measured spectrum, and is capable of assessing a structural variation of the sample quantitatively. In particular, it is preferred for assessing presence/absence of denaturation of a protein quantitatively, and is effective in quality control in development or production of biopharmaceuticals including protein preparations, for example.

The spectrum measuring device 110 of FIG. 3 is configured from a measurement body 120, a signal processor 130, and a quantitative assessor 140 for variation of a spectrum.

The measurement body 120 has optical configurations and control configurations that are generally necessary for measuring spectra. An example comprising a light source lamp 1, a spectrometer 2, a sample part 4, a light detector 5 and a pH or temperature variator 8 is shown.

In the measurement body 120, the spectrometer 2 spectrally disperses an irradiation light from the light source lamp 1 to take out a single-wavelength light. This single-wavelength light transmits through a sample of the sample part 4 as a measurement light, and this transmitted light is detected by the light detector 5.

The sample part 4 is the same as the sample part of the first embodiment; however, it is configured such that a pH or a temperature of the sample in a sample cell is controlled by the pH or temperature variator 8.

The signal processor 130 receives a detection signal from the light detector 5 to read out a spectral value. Moreover, the spectrometer 2 varies the wavelength of the measurement light in phases, so that the signal processor 130 can calculate a spectral data of the sample. The spectral data is a data consisting of spectral values of each point of n wavelength points i, and is usually shown as the wavelengths of the measurement light on the horizontal axis and the spectral values on the vertical axis.

Here, the quantitative assessor 140 for variation of a spectrum that is characteristic in the present invention is described. The quantitative assessor 140 is configured of computers or the like, and comprises a weighting function deriver 142, a storage 144 and a numerical evaluator 146 that function by execution actions of programs stored therein.

To the reference substance of the sample part 4, an external stimulus such as a pH variation or a temperature variation is imparted by the pH or temperature variator 8. The measurement body 120 measures the spectrum of the reference substance before and after such external stimulus is imparted. Accordingly, a spectrum R of the reference substance before the external stimulus is imparted and a spectrum R' of the reference substance after the external stimulus is imparted are sent from the signal processor 130 to the weighting function deriver 142, respectively.

The weighting function deriver 142 derives a weighting function ($\xi$) that provides an absolute value of the difference between each spectral value Ri, Ri' of the reference substance before and after the external stimulus is imparted as the weighting value of each data point. This weighting function is shown as Equation (7A).

[Math. 21A]

$$\xi = |R' - R| \quad (7A)$$

Figure 4:
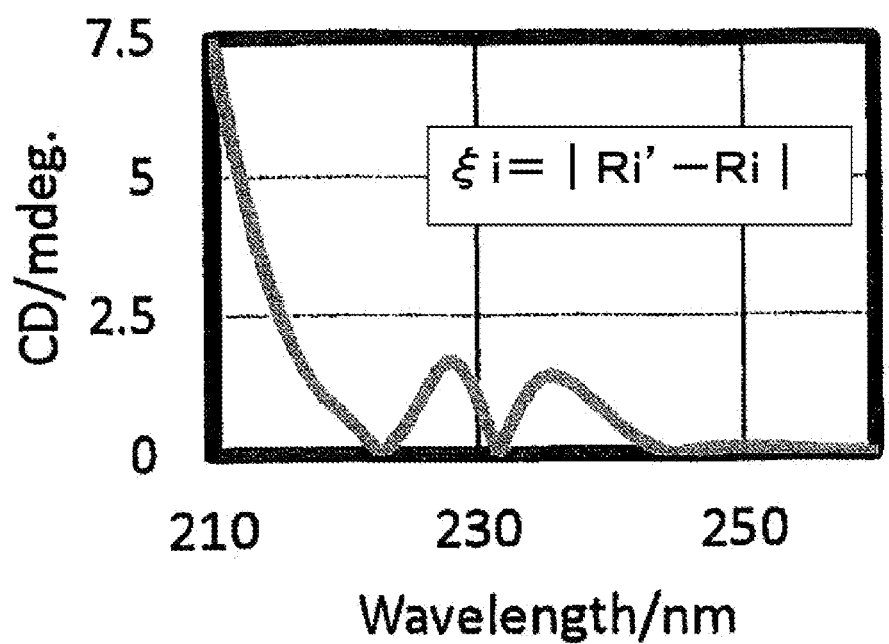
FIG. 4 shows an example of a weighting function (ξ).

Moreover, when the spectrum measuring device 110 is a CD spectrum measuring device, the temperature condition of the reference substance is varied from 25° C. to 50° C. to measure the respective CD spectral data. A specific example of the weighting function $\xi$ based on these data is shown in FIG. 4.

The storage 144 of FIG. 3 is configured to store the derived weighting function $\xi$ together with a data R of the reference spectrum such that the numerical evaluator 146 can read them out suitably.

The numerical evaluator 146 receives a data of the sample spectrum U measured for the target sample from the signal processor 130. When evaluating the difference between the sample spectrum and the reference spectrum, the numerical evaluator 146 may use the reference spectrum stored in the storage 144, or may receive a reference spectrum acquired by newly measuring the reference substance from the signal processor 130. Based on the information, the degree of individual coincidence $((U_i - R_i)^2)$ between the sample spectrum U and the reference spectrum R is calculated for each wavelength point i.

Moreover, the numerical evaluator 146 uses the weighting function $\xi$ to acquire the weighting value $\xi i$ of each wavelength point i. Then, the numerical evaluator 146 multiplies the degree of individual coincidence of each wavelength point by "$\xi i/\xi ave$" like Equation (8) to weight the degree of individual coincidence. Here, one that standardized the weighting value "$\xi i$" by an average value "$\xi ave$" of the weighting values is used; however, instead of Equation (8), it may be weighted by multiplying the degree of individual coincidence by "$\xi i$".

[Math. 22]

$$(U_i - R_i)^2 \cdot \frac{\xi_i}{\xi_{ave}} \quad (8)$$

$$\text{here, } \xi_{ave} = \frac{1}{n} \cdot \sum_{i=1}^{n} \xi_i$$

Finally, in accordance with Equation (9), the difference between the reference spectrum and the sample spectrum is evaluated by acquiring an average value of the weighted degrees of individual coincidence and calculating a square root thereof.

[Math. 23]

$$I = \sqrt{\frac{1}{n} \cdot \sum_{i=1}^{n} \left( (U_i - R_i)^2 \cdot \frac{\xi_i}{\xi_{ave}} \right)} \quad (9)$$

By using the above configuration, the numerical value I that denotes the difference between the reference spectrum and the sample spectrum is calculated, and is output from the numerical evaluator 146.

Third Embodiment

Figure 5:
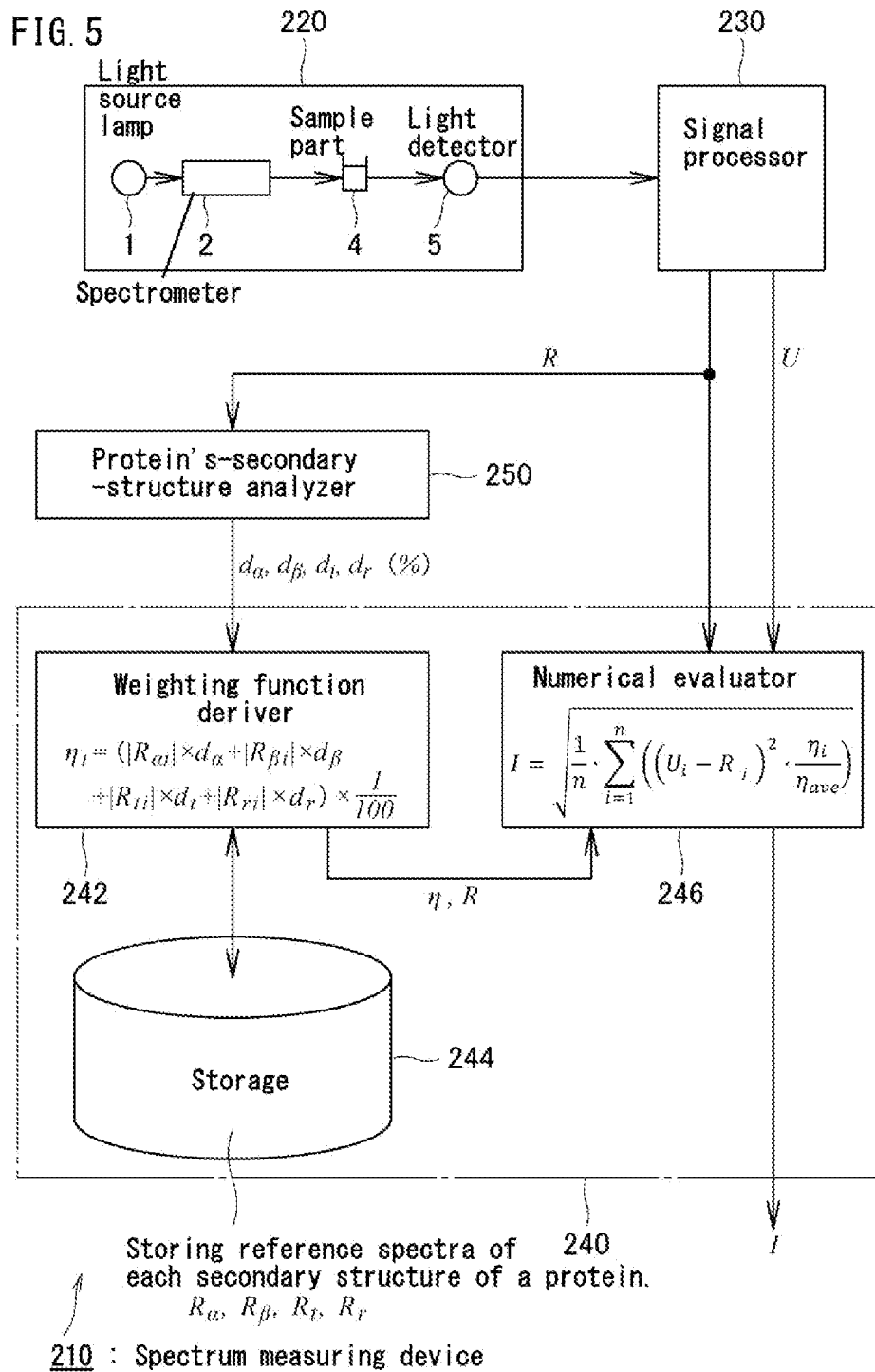
FIG. 5 is a schematic configuration of a spectrum measuring device according to the third embodiment.

Next, the configuration of the spectrum measuring device according to the third embodiment is described based on FIG. 5. This spectrum measuring device 210 basically has a configuration in common with the device of the second embodiment; therefore, repetitive descriptions are omitted, and configurations that differ therefrom are described in detail.

The spectrum measuring device 210 is configured from a measurement body 220, a signal processor 230, a quantitative assessor 240 for variation of a spectrum, and a protein's-secondary-structure analyzer 250.

The measurement body 220 measures spectra of a protein such as CD spectra, IR spectra, Raman spectra, and NMR spectra, for example.

The protein's-secondary-structure analyzer 250 analyzes secondary structures (σ-helix, β-sheet, β-turn, random coil and the like) contained in a protein, the reference substance based on a data R of the reference spectrum, and can acquire proportions (%) of each secondary structure. Here, the proportion of α-helix is denoted as "dα", the proportion of β-sheet is denoted as "dβ", the proportion of β-turn is denoted as "dt", and the proportion of random coil is denoted as "dr".

The weighting function deriver 242 receives the proportion data of each secondary structure analyzed by the secondary-structure analyzer 250, reads out the reference spectra "Rα, Rβ, Rt, Rr" of each secondary structure from the storage 244, and derives a total spectrum denoted as Equation (9A) as the weighting function η.

[Math. 23A]

η=(|Rα|·dα

+|Rβ|·dβ

+|Rt|·dt

+|Rr|·dr)/100       (9A)

Figure 6:
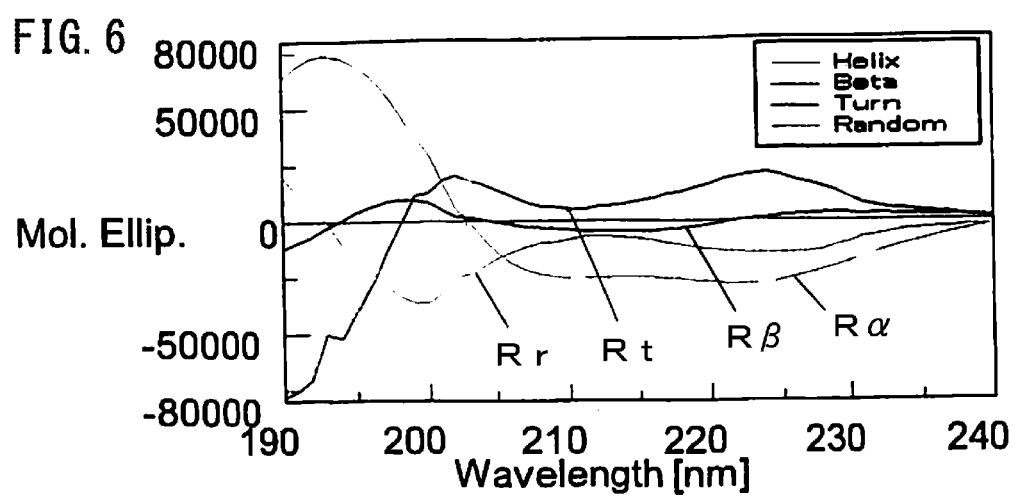
FIG. 6 shows an example of reference spectra of each secondary structure configuring a protein.

Here, the reference spectra of Professor Yang that is an example of a well-known data of the reference spectra of each secondary structure of a protein are shown in FIG. 6. (Jen Tsi Yang, Chuen-Shang C. Wu, and Hugo M. Martinez, Methods in Enzymology, 130, 208-269, (1986).)

The storage 244 of FIG. 5 is configured to store the derived weighting function η together with a data R of the reference spectrum such that the numerical evaluator 246 can read them out suitably.

The numerical evaluator 246 receives a data of a sample spectrum U measured for the target sample from the signal processor 230. When evaluating the difference between the sample spectrum and the reference spectrum, the numerical evaluator 246 may use the reference spectrum stored in the storage 244, or may receive a reference spectrum acquired by newly measuring the reference substance from the signal processor 230. Based on the information, the degree of individual coincidence (($U_i - R_i$)$^2$) between the sample spectrum U and the reference spectrum R is calculated for each wavelength point i.

Moreover, the numerical evaluator 246 uses the weighting function η to acquire a weighting value ηi of each wavelength point i. Then, the numerical evaluator 246 multiplies the degree of individual coincidence of each wavelength point by "ηi/ηave" like Equation (10) to weight the degree of individual coincidence. Here, one that standardized the weighting value "ηi" by an average value "ηave" of the weighting values is used; however, instead of Equation (10), it may be weighted by multiplying the degree of individual coincidence by "ηi".

[Math. 24]

$$(U_i - R_i)^2 \cdot \frac{\eta_i}{\eta_{ave}} \quad (10)$$

here, $\eta_{ave} = \frac{1}{n} \cdot \sum_{i=1}^{n} \eta_i$

Finally, in accordance with Equation (11), the difference between the reference spectrum and the sample spectrum is evaluated by acquiring an average value of the weighted degrees of individual coincidence and calculating its square root.

[Math. 25]

$$I = \sqrt{\frac{1}{n} \cdot \sum_{i=1}^{n}\left((U_i - R_i)^2 \cdot \frac{\eta_i}{\eta_{ave}}\right)} \quad (11)$$

By using the above configuration, the numerical value I that denotes the difference between the reference spectrum and the sample spectrum is calculated, and is output from the numerical evaluator 246.

Fourth Embodiment

Figure 7:
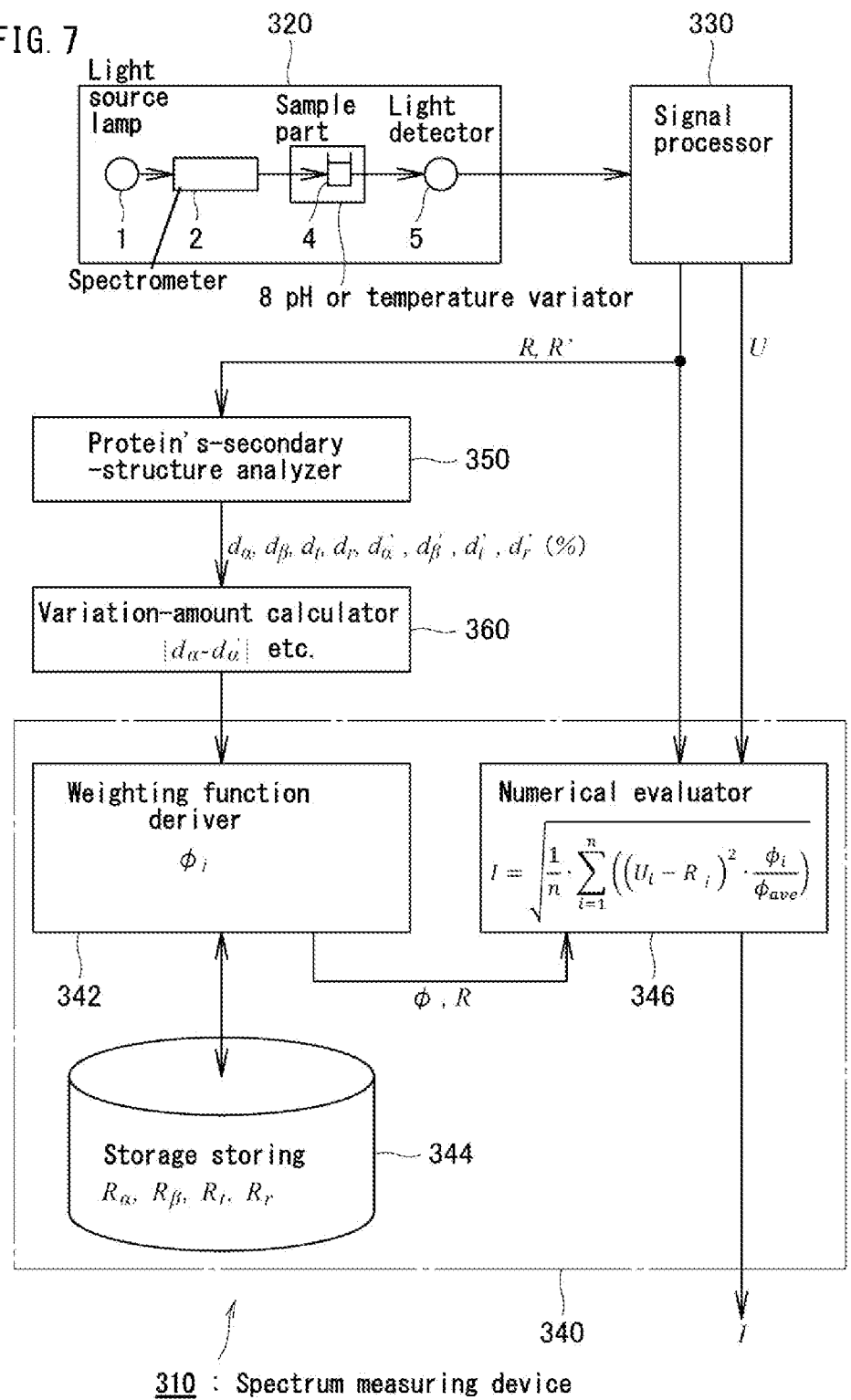
FIG. 7 is a schematic configuration of a spectrum measuring device according to the fourth embodiment.
Figure 8:
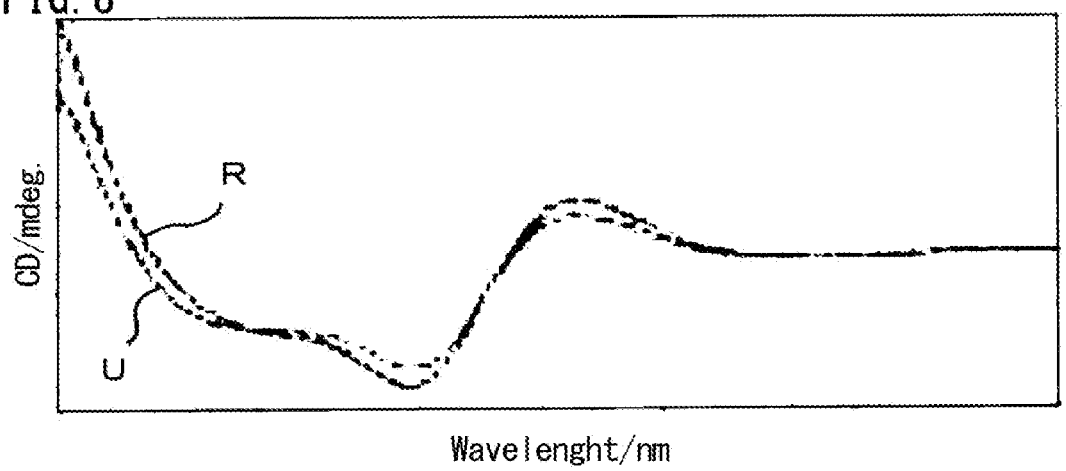
FIG. 8 shows two spectra (R, U) having a small difference between their spectral shapes.
Figure 9:
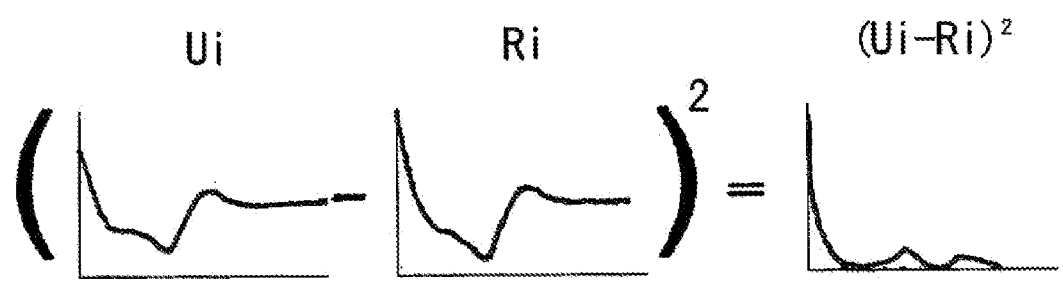
FIG. 9 shows an example of a degree of individual coincidence $((U_i-R_i)^2)$ of two spectra.

Next, the configuration of the spectrum measuring device according to the fourth embodiment is described based on FIG. 7. This spectrum measuring device 310 basically has a configuration in common with the device of the second embodiment; therefore, repetitive descriptions are omitted, and configurations that differ therefrom are described in detail.

The spectrum measuring device 310 is configured from a measurement body 320, a signal processor 330, a quantitative assessor 340 for variation of a spectrum, a protein's-secondary-structure analyzer 350, and a variation-amount calculator 360.

A protein is placed in the sample part 4 of the measurement body 320 as the reference substance, and an external stimulus such as a pH variation or a temperature variation is imparted by the pH or temperature variator 8. The measurement body 320 measures the spectrum for the protein before and after such external stimulus is imparted. Accordingly, the signal processor 330 sends a spectrum R of the reference substance before the external stimulus is imparted and a spectrum R' of the reference substance after the external stimulus is imparted to the protein's-secondary-structure analyzer 350, respectively. The measurement body 320 measures spectra of a protein such as CD spectra, IR spectra, Raman spectra, and NMR spectra, for example.

The protein's-secondary-structure analyzer 350 analyzes secondary structures (α-helix, β-sheet, β-turn, random coil and the like) contained in a protein, the reference substance, based on a data R of the reference spectrum before the external stimulus is imparted, and can acquire proportions (%) of each secondary structure. Here, the proportion of α-helix is denoted as dα, the proportion of β-sheet is denoted as dβ, the proportion of β-turn is denoted as dt, and the proportion of random coil is denoted as dr. Moreover, the secondary structures of a protein are analyzed based on a data R' of the reference spectrum after the external stimulus is imparted, and proportions (%) of dα', dβ', dt', and dr' of each secondary structure can be acquired.

The variation-amount calculator 360 receives proportion data of each secondary structure from the secondary-structure analyzer 350, and calculates an absolute value (e.g., |dα−dα'|) of an amount of variation of proportion before and after the external stimulus is imparted for each secondary structure.

The weighting function deriver 342 receives data of the absolute value of the amount of variation of proportions calculated by the variation-amount calculator 360, reads out the reference spectra "Rα, Rβ, Rt, Rr" of each secondary structure from the storage 344, and derives a total spectrum denoted as Equation (11A) as the weighting function φ.

[Math. 25A]

φ=(|Rα|·|dα−dα|

+|Rβ|·|dβ−dβ'|

+|Rt|·|dt−dt'|

+|Rr|·|dr−dr'|)/100  (11A)

The storage 344 of FIG. 7 is configured to store the derived weighting function η together with a data R of the reference spectrum such that the numerical evaluator 346 can read them out suitably.

The numerical evaluator 346 receives a data of a sample spectrum U measured for the target sample from the signal processor 330. When evaluating the difference between the sample spectrum and the reference spectrum, the numerical evaluator 346 may use the reference spectrum stored in the storage 344, or may receive a reference spectrum acquired by newly measuring the reference substance from the signal processor 330. Based on the information, the degree of individual coincidence $((U_i - R_i)^2)$ between the sample spectrum U and the reference spectrum R is calculated for each wavelength point i.

Moreover, the numerical evaluator 346 uses the weighting function φ to acquire a weighting value φi of each wavelength point i. Then, the numerical evaluator 346 multiplies the degree of individual coincidence of each wavelength point by "φi/φave" like Equation (12) to weight the degree of individual coincidence. Here, one that standardized the weighting value "φi" by an average value "φave" of the weighting values is used; however, instead of Equation (12), it may be weighted by multiplying the degree of individual coincidence by "φi".

[Math. 26]

$$(U_i - R_i)^2 \cdot \frac{\phi_i}{\phi_{ave}} \quad (12)$$

$$\text{here, } \phi_{ave} = \frac{1}{n} \cdot \sum_{i=1}^{n} \phi_i$$

Finally, in accordance with Equation (13), the difference between the reference spectrum and the sample spectrum is evaluated by acquiring an average value of the weighted degrees of individual coincidence and calculating a square root thereof.

[Math. 27]

$$I = \sqrt{\frac{1}{n} \cdot \sum_{i=1}^{n}\left((U_i - R_i)^2 \cdot \frac{\phi_i}{\phi_{ave}}\right)} \quad (13)$$

By using the above configuration, the numerical value I that denotes the difference between the reference spectrum and the sample spectrum is calculated, and is output from the numerical evaluator 346.

The spectrum measuring devices of each embodiments described above may further comprise a noise eliminator capable of executing at least one of a noise-elimination processing such as a smoothing processing, a noise-elimination filtering processing using a high-speed Fourier transformation (FFT), and a principal-component analysis (PCA) to the measured reference spectrum R and the sample spectrum S. The smoothing processing refers to a data processing for smoothing waveforms of spectra, and known data processing methods such as "simple moving average method" can be adopted. The noise eliminator can be included in the signal processors of each spectrum measuring device or in the quantitative assessor. The numerical evaluator of the quantitative assessor may be configured to calculate the degree of individual coincidence for the reference spectrum and the sample spectrum of which noise is eliminated by this noise eliminator. By providing such noise eliminator, the spectrum measuring device can detect the difference between the spectral shapes with a higher sensitivity.

In the spectrum measuring devices of the first and second embodiments, the weighting function based on the reference spectrum of which noise is eliminated may be derived in the weighting function derivers 42, 142. Moreover, in the spectrum measuring devices of the third and fourth embodiments, analysis of the proportions (%) of the secondary structures based on the reference spectra of which noise is eliminated may be performed in the secondary-structure analyzers (corresponds to the component or structure analyzer) 250, 350.

In evaluation of Equation (7) of the first embodiment, another weighting value may be further applied. For example, the weighting function σ and the size of the reference spectrum (|Ri|) may be combined to apply a double weighting. Moreover, the weighting function σ and the weighting function ξ of Equation (7A) may be combined to apply a double weighting. Or, the weighting function σ and the weighting function η of Equation (9A) may be combined to apply a double weighting. Or, the weighting function σ and the weighting function φ of Equation (11A) may be combined to apply a double weighting. These evaluation equations (19) to (22) are shown. A multiple weighting may further be applied.

[Math. 28]

$$I = \sqrt{\frac{1}{n} \cdot \sum_{i=1}^{n}\left((U_i - \overline{R_i})^2 \cdot \frac{\sigma_{ave}}{\sigma_i} \cdot \frac{|R_i|}{|R_i|_{ave}}\right)} \quad (19)$$

$$I = \sqrt{\frac{1}{n} \cdot \sum_{i=1}^{n}\left((U_i - \overline{R_i})^2 \cdot \frac{\sigma_{ave}}{\sigma_i} \cdot \frac{\xi_i}{\xi_{ave}}\right)} \quad (20)$$

[Math. 29]

$$I = \sqrt{\frac{1}{n} \cdot \sum_{i=1}^{n}\left((U_i - \overline{R_i})^2 \cdot \frac{\sigma_{ave}}{\sigma_i} \cdot \frac{\eta_i}{\eta_{ave}}\right)} \quad (21)$$

$$I = \sqrt{\frac{1}{n} \cdot \sum_{i=1}^{n}\left((U_i - \overline{R_i})^2 \cdot \frac{\sigma_{ave}}{\sigma_i} \cdot \frac{\phi_i}{\phi_{ave}}\right)} \quad (22)$$

By standardizing the weighting values (σi, ξi, φi, ηi, |Ri|) by the average values of respective weighting values (σave, ξave, φave, ηave, |Ri|ave), the following advantages may be achieved, for example. When applying a double weighting (e.g., σi and ξi), if one weighting value is excessive than the other (e.g., σi<<ξi), the influence of one weighting value (ξi) becomes larger, and the influence of the other weighting value (σi) becomes smaller. Accordingly, by using the weighting value standardized by the average value as shown in the examples of Equations (19) to (22), respective weightings can be equally applied when applying a multiple weighting.

The pH or temperature variator 8 of the second and fourth embodiment is an example of the external-stimulus imparter of the present invention. The external stimulus imparted to the reference substance may be varying conditions such as temperature, pH, pressure, electric field, magnetic field, light, stress, protein concentration, types of buffers, concentration of buffers, types of additives, and concentration of additives, or may be addition of denaturants.

The spectrum measuring devices from the second to fourth embodiment are generally applicable to devices for measuring spectra such as CD spectra, infra-red absorption spectra, UV-Visible absorption spectra, fluorescent spectra, Raman spectra and the like.

Moreover, in the spectrum measuring devices from the second to fourth embodiments, instead of the reference spectrum R acquired by measuring the reference substance for one time, the average spectrum (refer to Equation (4)) of a plurality of spectra acquired by measuring the reference substance for a plurality of times may be used as the reference spectrum.

In the above embodiments, cases where the difference between spectra is evaluated by the Euclidean distance are described in detail; however, the difference between spectra can be evaluated by other manners such as the Manhattan distance like Equation (14), and correlation coefficients such as Equation (16) and (17).

When the numerical evaluator of each embodiment calculates the numerical value of the Euclidean distance (e.g., Equation (5)) or the Manhattan distance (e.g., Equation (14)) between the reference spectrum and the sample spectrum as the degree of individual coincidence, the numerical value of the Euclidean distance or the Manhattan distance may be calculated with those divided the reference spectrum and the sample spectrum by their respective spectral areas (a square root of a sum of squares). By performing such data processing, the difference between the spectral shapes can be acquired without being affected by a concentration error upon adjustment of the sample and the reference substance. Specifically, when the Euclidean distance is used, it may be better to use Equation (23), instead of Equation (5), as the degree of individual coincidence. Moreover, when the Manhattan distance is used, it may be better to use Equation (24), instead of Equation (14), as the degree of individual coincidence.

[Math. 30]

$$\left(\frac{U_i}{\sqrt{\sum_{i=1}^{n} U_i^2}} - \frac{R_i}{\sqrt{\sum_{i=1}^{n} R_i^2}}\right)^2 \quad (23)$$

$$\left|\frac{U_i}{\sqrt{\sum_{i=1}^{n} U_i^2}} - \frac{R_i}{\sqrt{\sum_{i=1}^{n} R_i^2}}\right| \quad (24)$$

Standardization with an area such as Equations (23), (24) is not necessary when evaluating with correlation coefficients such as Equations (16), (17).

REFERENCE SIGNS LIST

1 Light source lamp
2 Spectrometer
3 Polarization modulator (PEM)
4 Sample part
5 Light detector
6 Amplifier
7 HT voltage regulator
8 pH or temperature variator (external-stimulus imparter)
10 CD spectrum measuring device
20 Measurement body (spectrum measuring section)
30 Signal processor
40 Quantitative assessor
42 Weighting function deriver
44 Storage
46 Numerical evaluator
110 Spectrum measuring device
120 Measurement body (spectrum measuring section)
130 Signal processor
140 Quantitative assessor
142 Weighting function deriver
144 Storage
146 Numerical evaluator
210 Spectrum measuring device
220 Measurement body (spectrum measuring section)
230 Signal processor
240 Quantitative assessor
242 Weighting function deriver
244 Storage
246 Numerical evaluator
250 Protein's-secondary-structure analyzer (component or structure analyzer)
310 Spectrum measuring device
320 Measurement body (spectrum measuring section)
330 Signal processor
340 Quantitative assessor
342 Weighting function deriver
344 Storage
346 Numerical evaluator
350 Protein's-secondary-structure analyzer (component or structure analyzer)
360 Variation-amount calculator

What is claimed is:

1. A spectrum measuring device for measuring a spectrum that can be plotted with the horizontal axis as a data point column and the vertical axis as a spectral value of each data point, and evaluating a difference between a reference spectrum acquired by measuring a reference substance and a sample spectrum acquired by measuring a target sample, the spectrum measuring device comprising:

a spectrum measuring section that measures a spectrum of the target sample and each spectrum of the reference substance;

a processor configured to derive a relation, as a weighting function ($\sigma=f(HT)$), between a gain-adjustment voltage value (HTi) in a certain data point and a degree of dispersion ($\sigma i$) of a plurality of spectral values measured in that data point based on the gain-adjustment voltage value of each data point applied to a light detector and the acquired plurality of reference spectra, in measurement of the reference substance performed for a plurality of times; and a storage that stores the weighting function;
wherein the processor is further configured to perform a numerical evaluation using the weighting function to evaluate the difference between the reference spectrum acquired by measuring the reference substance for one or more times and the sample spectrum;
wherein, in performing the numerical evaluation, the processor is configured to:
calculate a degree of individual coincidence between the sample spectrum and the reference spectrum for each data point, and calculate the degree of dispersion (σi) acquired by applying the gain-adjustment voltage value (HTi) of each data point of when the sample spectrum is measured to the weighting function (σ), wherein the calculated degree of dispersion (σi) is a weighting value (σi) according to the size of the noise component contained in the reference spectra; and
evaluate the difference between the reference spectrum and the sample spectrum based on the degree of individual coincidence to which the weighting value (σi) is applied.

2. The spectrum measuring device of claim 1, wherein the processor is configured to further apply a different weighting value to the degree of individual coincidence to which the weighting value (σi) is applied.

3. The spectrum measuring device of claim 1 further comprising:
an external-stimulus imparter that imparts an external stimulus to the reference substance;
wherein the spectrum measuring section measures the spectrum of the target sample and each spectrum of the reference substance before and after the external stimulus is imparted;
the processor is configured to further derive a weighting function (ξ=f(R, R')) that provides a weighting value (ξi) according to an amount of variation of spectral values (Ri, Ri') of each data point before and after the external stimulus is imparted to the reference substance, and
the processor, in performing the numerical evaluation, is configured to calculate the degree of individual coincidence between the sample spectrum and the reference spectrum for each data point, and evaluate the difference between the reference spectrum and the sample spectrum by the weighting value (ξi) of each data point provided by the weighting function (ξ) based on the degree of individual coincidence to which the weighting values (σi) and (ξi) are applied.

4. The spectrum measuring device of claim 3, wherein the processor is configured to derive the weighting function (ξ) which provides an absolute value (|Ri'−Ri|) of a difference between each spectral value (Ri, Ri') of the reference substance before and after the external stimulus is imparted as the weighting value (ξi).

5. The spectrum measuring device of claim 1, of which a sample containing a plurality of components or structures is set as a measurement target,
wherein the processor is configured to acquire proportions of each component or structure contained in the reference substance based on the reference spectrum;
wherein the processor is configured to further add up those that multiplied the absolute value of the reference spectrum of each component or structure by the proportion of the component or structure for all components or structures to calculate a total spectrum, and derive the total spectrum as a weighting function (η) that provides a weighting value (ηi) of each data point, and
the processor, in performing the numerical evaluation, is configured to calculate the degree of individual coincidence between the sample spectrum and the reference spectrum for each data point, and evaluate the difference between the reference spectrum and the sample spectrum by the weighting value (ηi) of each data point provided by the weighting function (η) based on the degree of individual coincidence to which the weighting values (σi) and (ηi) are applied.

6. The spectrum measuring device of claim 1, of which a sample containing a plurality of components or structures is set as a measurement target, further comprising:
an external-stimulus imparter that imparts an external stimulus to the reference substance;
wherein the spectrum measuring section is operable to measure a spectrum of the target sample and each spectrum of the reference substance before and after the external stimulus is imparted;
wherein the processor is configured to acquire respective proportions of each component or structure contained in the reference substance based on a spectrum (R) of the reference substance before the external stimulus is imparted, and acquires respective proportions of each component or structure contained in the reference substance after the external stimulus is imparted based on a spectrum (R') of the reference substance after the external stimulus is imparted;
the processor is configured to calculate an absolute value of an amount of variation of the proportions before and after the external stimulus is imparted for each component or structure of the reference substance,
wherein the processor is configured to further add up those that multiplied the absolute value of the reference spectrum of each component or structure by the absolute value of the amount of variation of the proportions of the component or structure for all components or structures to calculate a total spectrum, and derive the total spectrum as a weighting function (φ) that provides a weighting value (φi) of each data point, and
the processor, in performing the numerical evaluation, is configured to calculate the degree of individual coincidence between the sample spectrum and the reference spectrum for each data point, and evaluate the difference between the reference spectrum and the sample spectrum by the weighting value (φi) of each data point provided by the weighting function (φ) based on the degree of individual coincidence to which the weighting values (σi) and (φi) are applied.

7. The spectrum measuring device of claim 1, wherein the processor is further configured to execute a noise elimination processing to a measurement data of the reference spectrum and the sample spectrum that are measured, and
wherein the processor calculates the degree of individual coincidence for the reference spectrum and the sample spectrum of which noise is eliminated by the noise elimination processing.

8. The spectrum measuring device of claim 1, wherein the processor, in performing the numerical evaluation, is configured to calculate the difference between spectra by at least one of the Euclidean distance, the Manhattan distance and a correlation coefficient based on the degree of individual coincidence to which the weighting value is applied.

9. The spectrum measuring device of claim 8, wherein, when calculating a numerical value of the Euclidean distance or the Manhattan distance between the reference spectrum and the sample spectrum, the processor uses those that divided the reference spectrum and the sample spectrum by their respective spectral areas to calculate the numerical value of the Euclidean distance or the Manhattan distance.

10. The spectrum measuring device of claim 1, wherein, the gain-adjustment voltage value (HTi) is applied to the light detector to increase or decrease the gain of the light detector for each data point so as to keep the size of the detection signal constant.

11. A spectrum measuring device for measuring a spectrum that can be plotted with the horizontal axis as a data point column and the vertical axis as a spectral value of each data point, and evaluating a difference between a reference spectrum acquired by measuring a reference substance and a sample spectrum acquired by measuring a target sample, the spectrum measuring device comprising:
   an external-stimulus imparter that imparts an external stimulus to the reference substance;
   a spectrum measuring section that measures a spectrum of the target sample and each spectrum of the reference substance before and after the external stimulus is imparted;
   a processor configured to derive a weighting function ($\sigma=f(R, R')$) that provides a weighting value ($\xi i$) according to an amount of variation of spectral values (Ri, Ri') of each data point before and after the external stimulus is imparted to the reference substance; and
   a storage that stores the weighting function;
   wherein the processor is further configured to perform a numerical evaluation using the weighting function to evaluate the difference between the reference spectrum and the sample spectrum;
   wherein, in performing the numerical evaluation, the processor is configured to calculate the degree of individual coincidence between the sample spectrum and the reference spectrum for each data point, and evaluate the difference between the reference spectrum and the sample spectrum by the weighting value ($\xi i$) of each data point provided by the weighting function ($\xi$) based on the degree of individual coincidence to which the weighting value ($\xi i$) is applied, and
   wherein, the processor is configured to derive the weighting function ($\xi$) which provides an absolute value (|Ri'−Ri|) of a difference between each spectral value (Ri, Ri') of the reference spectrum before and after the external stimulus is imparted as the weighting value ($\xi i$).

12. The spectrum measuring device of claim 11, wherein the processor, in performing the numerical evaluation, is configured to further apply a different weighting value to the degree of individual coincidence to which the weighting value ($\xi i$) is applied.

13. The spectrum measuring device of claim 11, wherein the processor is further configured to execute a noise elimination processing to a measurement data of the reference spectrum and the sample spectrum that are measured, and
   wherein the processor, in performing the numerical evaluation, calculates the degree of individual coincidence for the reference spectrum and the sample spectrum of which noise is eliminated by the noise elimination processing.

14. The spectrum measuring device of claim 11, wherein the processor, in performing the numerical evaluation, is configured to calculate the difference between spectra by at least one of the Euclidean distance, the Manhattan distance and a correlation coefficient based on the degree of individual coincidence to which the weighting value is applied.

15. The spectrum measuring device of claim 14, wherein, when calculating a numerical value of the Euclidean distance or the Manhattan distance between the reference spectrum and the sample spectrum, the processor uses those that divided the reference spectrum and the sample spectrum by their respective spectral areas to calculate the numerical value of the Euclidean distance or the Manhattan distance.

* * * * *

UNITED STATES PATENT AND TRADEMARK OFFICE
CERTIFICATE OF CORRECTION

PATENT NO. : 12,339,218 B2
APPLICATION NO. : 17/528712
DATED : June 24, 2025
INVENTOR(S) : Satoko Suzuki et al.

It is certified that error appears in the above-identified patent and that said Letters Patent is hereby corrected as shown below:

In the Claims

Column 27, Claim 11, Line 28, which reads:
($\sigma = f(R, R')$)
Should read:
($\xi = f(R, R')$)

Signed and Sealed this
Twelfth Day of August, 2025

Coke Morgan Stewart
*Acting Director of the United States Patent and Trademark Office*